(12) United States Patent
Kropp et al.

(10) Patent No.: US 9,668,084 B2
(45) Date of Patent: May 30, 2017

(54) WIRELESS COMMUNICATION ASSEMBLY

(71) Applicants: Doug Kropp, Fairfield, IA (US); Mark Cox, Fairfield, IA (US); Matt Remijn, Fairfield, IA (US); Scott Gauche, Fairfield, IA (US)

(72) Inventors: Doug Kropp, Fairfield, IA (US); Mark Cox, Fairfield, IA (US); Matt Remijn, Fairfield, IA (US); Scott Gauche, Fairfield, IA (US)

(73) Assignee: Dexter Laundry, Inc., Fairfield, IA (US)

( * ) Notice: Subject to any disclaimer, the term of this patent is extended or adjusted under 35 U.S.C. 154(b) by 0 days.

(21) Appl. No.: 14/707,316

(22) Filed: May 8, 2015

(65) Prior Publication Data

US 2016/0330572 A1   Nov. 10, 2016

(51) Int. Cl.
*H04B 7/00* (2006.01)
*H04W 4/00* (2009.01)
*D06F 33/02* (2006.01)
*D06F 58/28* (2006.01)

(52) U.S. Cl.
CPC ............ *H04W 4/008* (2013.01); *D06F 33/02* (2013.01); *D06F 58/28* (2013.01); *D06F 2058/2883* (2013.01); *D06F 2202/12* (2013.01)

(58) Field of Classification Search
CPC ...................................... H04W 4/008
See application file for complete search history.

(56) References Cited

U.S. PATENT DOCUMENTS

2009/0280743 A1* 11/2009 Gast .................. B23Q 1/0027
                                                        455/41.2

* cited by examiner

*Primary Examiner* — Hsin-Chun Liao
(74) *Attorney, Agent, or Firm* — Varnum, Riddering, Schmidt & Howlett LLP

(57) ABSTRACT

A wireless communication assembly includes a driver module connected to a first portion of a machine, such as a laundry machine, and a receiver module connected to a second portion of the machine, such as a rotatable drum. The first module includes a primary coil configured to generate an electromagnetic field and a first wireless transceiver. The second module includes a secondary coil configured to convert energy within the electromagnetic field into electric power, and a second wireless transceiver powered by the secondary coil and configured to communicate with the first wireless transceiver. One or more sensors may be positioned within the drum to measure various conditions. The receiver module may be powered by the secondary coil and when powered on, may communicate data from the one or more sensors to the first module.

20 Claims, 7 Drawing Sheets

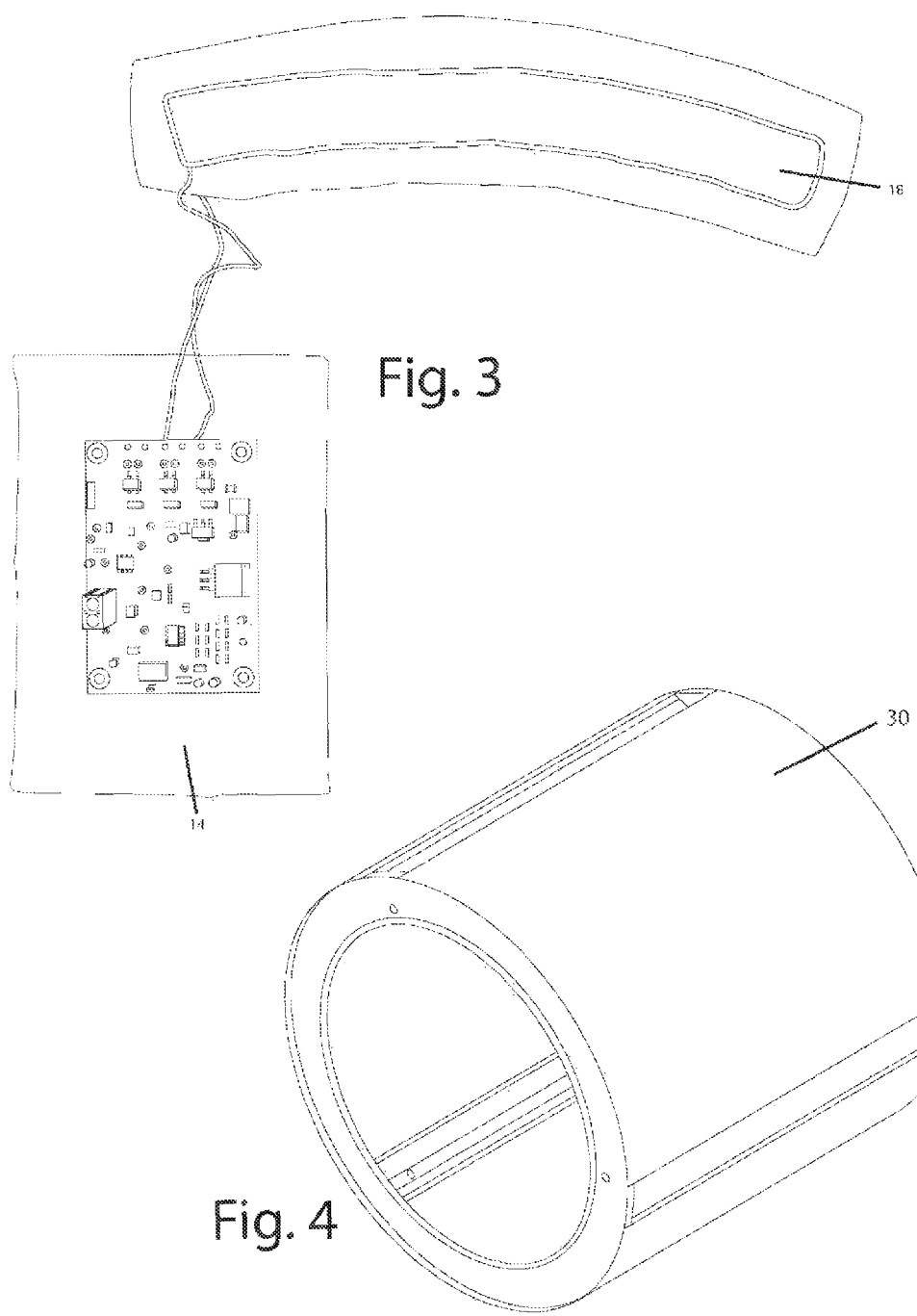

WIRELESS COMMUNICATION ASSEMBLY

FIELD OF INVENTION

The present invention relates to wireless power and signal transmission to and from sensors within a rotating cylinder or drum.

BACKGROUND

In laundry machines, such as washers and dryers, clothes are commonly tumbled and spun in a rotating drum. In washing machines, clothes are agitated and washed within water that flows into the drum, and spun in the drum to remove water. In dryers, wet clothes are tumbled in a drum at heated temperatures to remove the water from the clothes. The drum is commonly cylindrical and configured to spin on an axis with respect to the base of the washer or dryer.

In both washers and dryers, it may be important to monitor the condition of the clothes within the rotating drum. Placing sensors within the drum is an accurate way to measure conditions and obtain useful data, including temperature of the water or clothes, moisture content, smoke, speed, cleanliness of water (turbidity), as well as other information and conditions. In current laundry machines, however, powering and communicating with sensors within the rotating drum may be difficult.

One obstacle to monitoring sensors within the drum in current laundry machines is managing the required wired connections. Each sensor requires one or more wires to power the sensor and communicate a signal back to a central processor. The wires must be run from the base of the washer or dryer, through the drum axis, and into the drum. The wires are often harnessed together and run as a bundle through the axis. However, this type of connection scheme is problematic due to damage that may occur to the wires or inconsistent voltage readings that may be caused by the movement of the drum. Further, running the wires through the axis may weaken the axis increase the chances of structural damage to the machine. Moreover, replacing and repairing any damage to wires within the harness or within the drum axis may be exceedingly complex and difficult.

Accordingly, an improved power and signal communication scheme for sensors within a laundry machine is needed.

SUMMARY

A wireless communication assembly includes a first module connected to a first portion of a machine, such as a laundry machine, and a second module connected to a second portion of the machine. The second portion of the machine is configured to move or rotate with respect to the first portion. The first module includes a primary coil configured to generate an electromagnetic field and a first wireless transceiver. The second module includes a secondary coil configured to convert energy within the electromagnetic field into electric power, and a second wireless transceiver powered by the secondary coil and configured to communicate with the first wireless transceiver. One or more sensors may be positioned within the second portion of the machine and may be in communication with the second module. The second wireless transceiver may be powered by the secondary coil and communicate data from the one or more sensors to the first module.

In an embodiment, a method of obtaining remote sensor data includes providing a first module connected to a first portion of a machine and having a primary coil and a first wireless transceiver; providing a second module connected to a second portion of the machine and having a secondary coil and a second wireless transceiver; providing electric power to the primary coil to generate an electromagnetic field; moving the second portion of the machine into a position wherein the secondary coil is within the electromagnetic field; converting electromagnetic power at the secondary coil into electric power; powering one or more sensors and the second wireless transceiver with the electric power; receiving data from the one or more sensors at the second module; and communicating data related to the one or more sensors from the second wireless transceiver to the first wireless transceiver.

In an embodiment, the first portion of the machine may comprise a base of the machine and the second portion may comprise a drum configured to rotate with respect to the base. The drum may be cylindrical in shape.

In an embodiment, the first wireless transceiver and second wireless transceiver may be configured to communicate via Bluetooth wireless communication. The first module may communicate data related to the sensors to the machine, such as to a controller or processor on the machine. The one or more sensors may be configured to measure at least one of temperature, moisture, speed, turbidity, ozone level of water, humidity, chemical level of water, or resistivity of clothes to moisture.

BRIEF DESCRIPTION OF THE DRAWINGS

The operation of the invention may be better understood by reference to the detailed description taken in connection with the following illustrations, wherein:

FIG. 3 illustrates a receiver module and secondary coil;

FIG. 4 illustrates a laundry machine drum;

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A wireless communication assembly 10 is generally presented. The wireless communication assembly 10 may be configured to send and receive both power and communication signals between two modules of the assembly 10 to provide power and signal capabilities to remote portions of a machine, such as a laundry machine.

Figure 1:
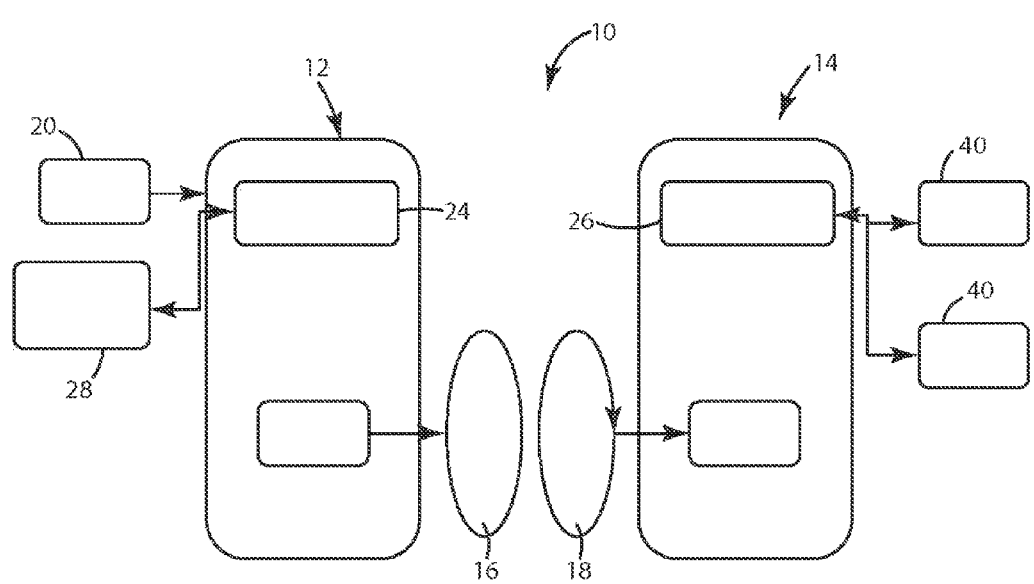
FIG. 1 illustrates a system diagram of a wireless communication assembly.
Figure 2:
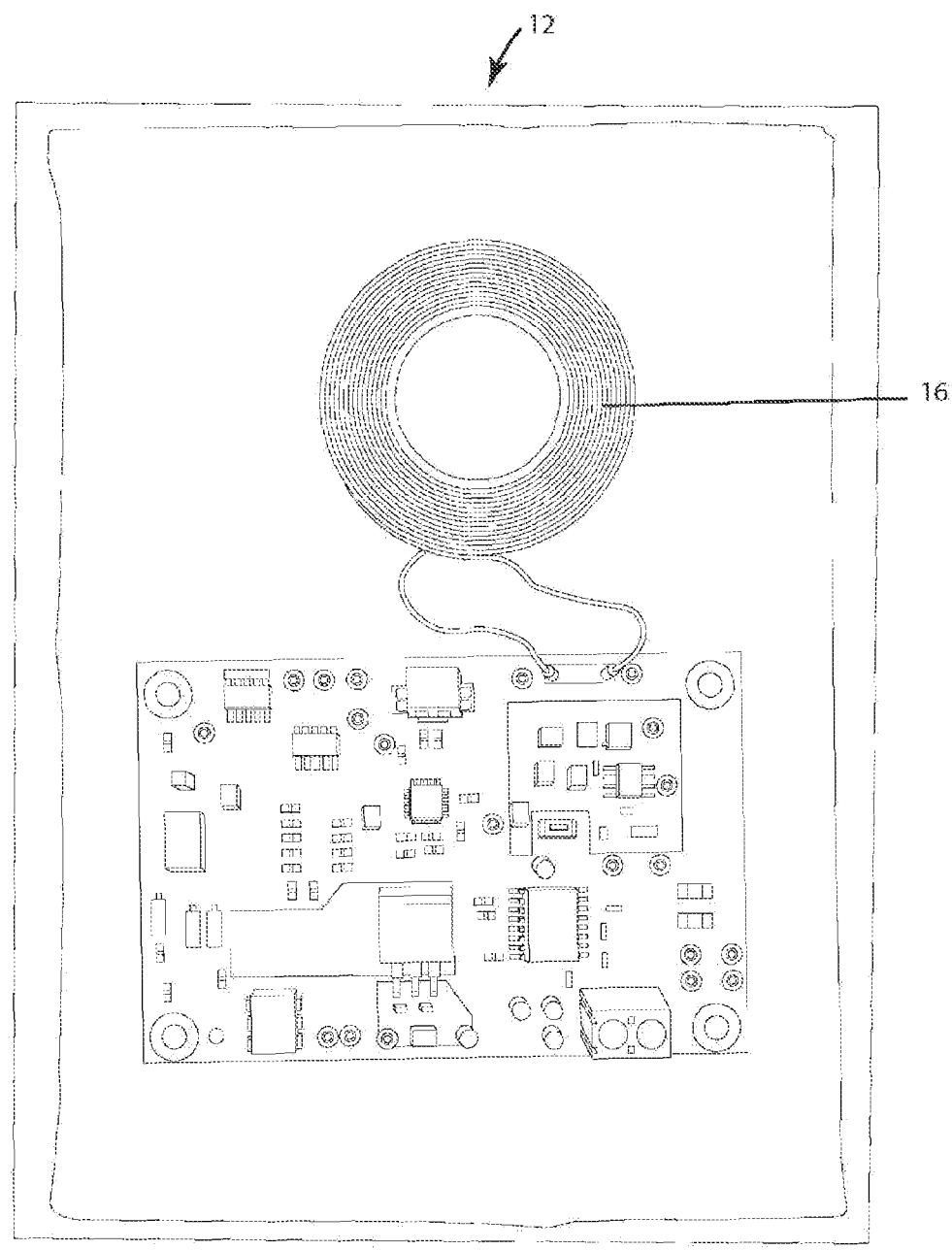
FIG. 2 illustrates a driver module and primary coil.

FIG. 1 illustrates a system diagram of the communication assembly 10. The assembly 10 includes a driver module 12 and a receiver module 14. The driver module 12 and receiver modules 14 may be independent and not physically connected to each other in any way. The driver module 12 and receiver module 14 may each comprise a printed circuit board assembly ("PCBA") that integrates a plurality of different components, as further described below. The components may each be soldered or integrated onto the PCBA or otherwise connected thereto.

The driver module 12 and receiver module 14 may each be mounted to separate portions of a machine but within a desired proximity to one another. The driver module 12 may be configured to transfer both power and communication signals to the receiver module 14. Likewise, the receiver module 14 may be capable of receiving power and communication signals from the driver module and transferring communication signals to the driver module 12.

The driver module 12 may include a primary coil 16 for wirelessly transferring power to the receiver module 14. The receiver module 14 may include a secondary coil 18 to receive power from the driver module 12. It will be appreciated that the receiver module secondary coil 18 may be capable of transferring power to the primary coil 16. However, in some embodiments and configurations described herein, the driver module 12 may be configured to only transfer power from the primary coil 16 and not to receive power from the secondary coil 18. Likewise, in some embodiments and configurations the secondary coil 18 may be configured to only receive power and not to transfer power to the primary coil 16.

The power transfer between the primary coil 16 and the secondary coil 18 may be performed wirelessly, without any physical contact or wires connected between the coils 16, 18. The power transferred between the coils 16, 18 may use any appropriate method, such as near-field power transfer. For example, the primary coil 16 may be powered by a power supply 20. The power supply 20 may be located on the driver module 12 or directly on the machine. The primary coil 16 may convert the power from the power supply 20 into an electrical field 22, such as a time varying electromagnetic field. The primary coil 16 and secondary coil 18 may be inductively coupled and tuned to resonate at the same frequency. The secondary coil 18 may be positioned, at least temporarily, within the electrical field 22 generated by the primary coil 18 and may convert power within the electromagnetic field back into electric power.

It will be appreciated that the receiver module 14 may be free of any power supply or connection other than power received from the secondary coil 18.

The power supply 20 may be any appropriate type and size, such as an Alternating Current ("AC") or Direct Current ("DC") power supply. The power supply 20 may supply enough power to allow the primary coil 16 to create an electrical field 22 capable of transmitting at least 5 Watts of power to the secondary coil 18. The power supply 20 may receive power directly from a machine, such as a laundry machine, that the wireless communication assembly 10 is connected to.

The driver module 12 and receiver module 14 may be configured to wirelessly communicate with each other. The driver module 12 may include a first wireless transceiver 24 and the receiver module 14 may include a second wireless transceiver 26. The wireless transceivers may 24, 26 may be configured to communicate wirelessly with one another using any wireless communication protocol, such as Bluetooth, Wi-Fi, or the like.

The first wireless transceiver 24 on the driver module 12 may be powered by the power supply 20 and may be on at all times. The second wireless transceiver 26 on the receiver module 14 may be powered by the secondary coil 18 and may be powered on any time that the secondary coil 18 is receiving power from the primary coil 16.

The driver module 12 and receiver module 14 may each include various components to assist in the operations of the modules 12, 14. The components may include power regulation components, filters, diodes, microchips, microcontrollers, and other circuit and electrical components. Each component may be integrated in the PCBA of the driver or receiver module 12, 14 or may be connected thereto.

The wireless communication assembly 10 may be integrated into a machine, such as a laundry machine, to provide communication between the machine controller 28 and sensors or other devices at a remote location that is difficult to access with a hardwired connection. For example, laundry machines, such as washers and dryers, commonly include a drum 30 that is arranged to rotate or spin with respect to a base of the machine, as illustrated in FIG. 4. The machine base 32 may comprise any portions of the machine other than the drum 30, such as the frame, support structure, or the like. The drum 30 may be any appropriate size and shape, such as generally cylindrical and having a single open end. In washing machines the drum 30 may be configured to rotate and agitate on an axis to wash the clothes and to spin on the axis to remove water from the clothing. In dryers, the drum 30 may be configured to rotate on an axis with respect to the base of the machine to tumble the clothes. Communication between the laundry machine controller 28 and any sensors or powered devices within the drum 30 may be difficult due to the rotational movement of the drum 30 with respect to the base. Any direct powered connection must be connected through the axis that the drum 30 is configured to rotate on. However, such hardwire arrangements weaken the axis and increase the chances of structural damage to the axis and drum 30.

The wireless communication assembly 10 may be arranged on a laundry machine to provide wireless communication between sensors or devices within the drum 30 and the laundry machine controller 28. As shown in FIGS. 5-10, the driver module 12 may be mounted on the laundry machine base 32 and the receiver module 14 may be mounted on the drum 30 and configured to rotate with the drum 30. The driver module 12, and specifically the primary coil 16, may be positioned near an edge of the base 32 adjacent to the drum 30 and the secondary coil 18 may be positioned on or near an edge of the drum 30 to allow communication between the coils 16, 18 when they are within the required proximity.

Figure 5:
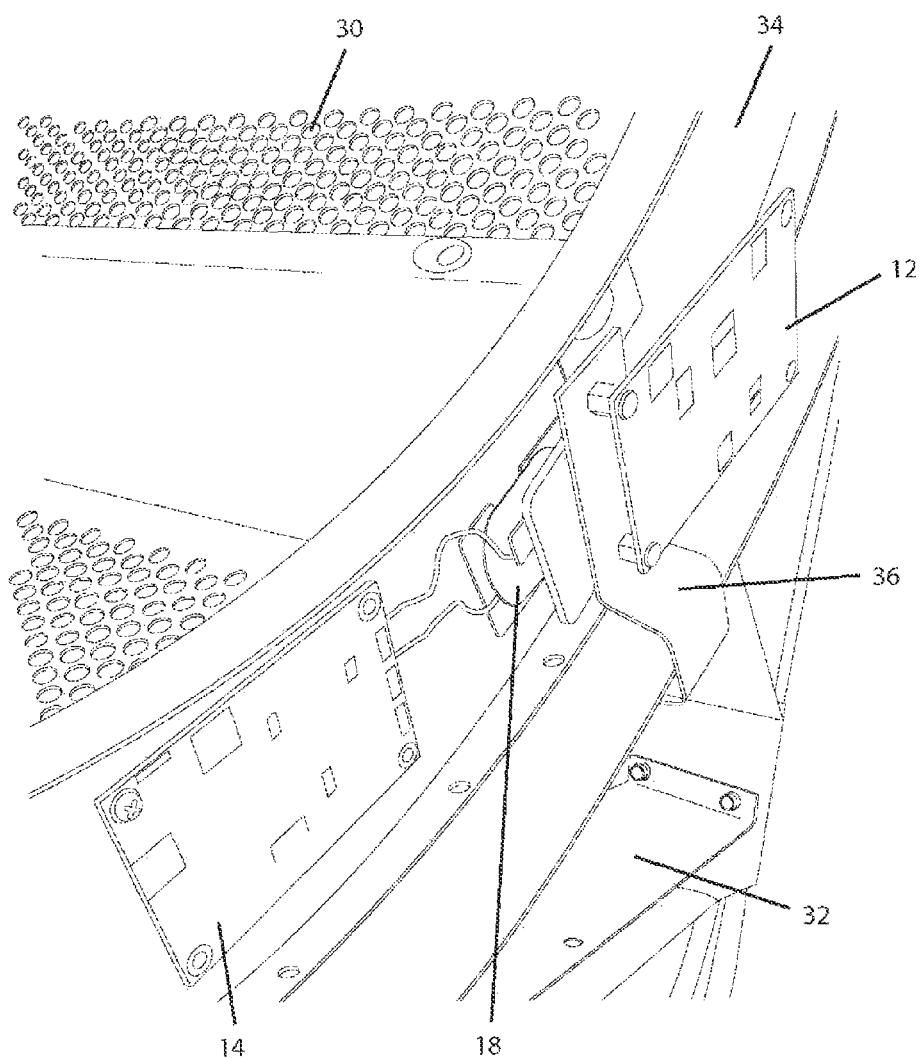
FIG. 5 illustrates a driver module and primary coil mounted to a base of a laundry machine and a receiver module and secondary coil mounted to a rotating drum.
Figure 6:
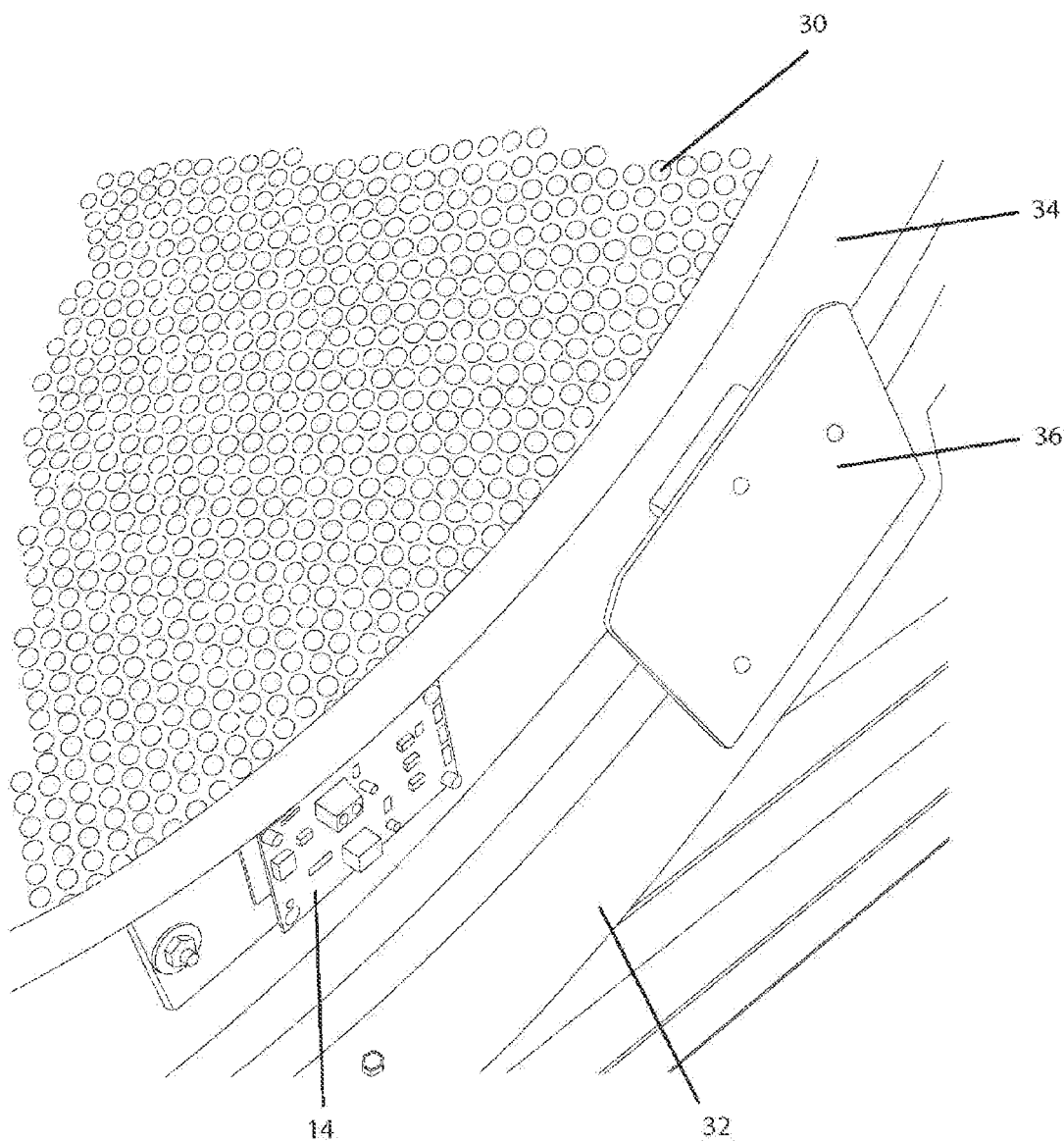
FIG. 6 illustrates a mounting bracket for a driver module mounted on a base of a laundry machine; and a receiver module mounded to the lip of a drum.
Figure 7:
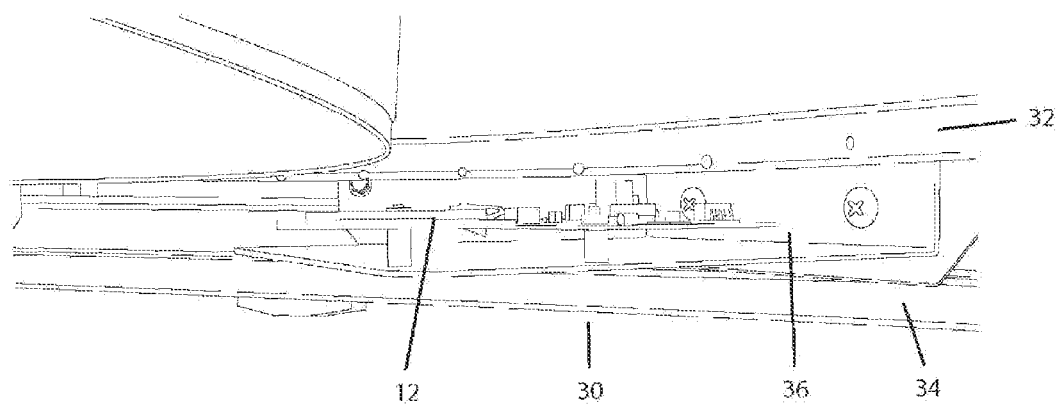
FIG. 7 illustrates a top view of a driver module connected to the base of a laundry machine by a bracket.

In an embodiment, the drum 30 may include a lip 34 positioned around the opening to the drum 30. The receiver module 14 may be mounted on or near the lip 34 and the coil may be positioned on the lip 34, as shown in FIGS. 5-7 and 9. The driver module 12 may be connected to the base 34 and positioned near or facing the lip 34 of the drum 30. For example, a bracket 36 may be mounted to the base 34 and extend toward the lip 34. The primary coil 16 may be mounted on the bracket 36 and positioned to face the lip 34. As the drum 30 rotates, the secondary coil 18 on the lip 34 will move into close proximity with the primary coil 16. For example, the secondary coil 18 may be located less than one inch away from the primary coil 16 during at least of portion of the travel of the second module 14, as shown in FIGS. 5-7. While the secondary coil 18 is within close proximity to the primary coil 16 and within the electrical field 22 generated by the primary coil 16, the secondary coil 18 may convert electromagnetic energy from the field 22 into electrical power. The power may be used to power on the second module 14 and communicate with the first module 12, as described in further detail below.

The drum 30 may include one or more sensors 40 mounted within or on the drum. The sensors 40 may include any appropriate type of sensor configured to provide feedback to the laundry machine regarding the condition of the machine, clothes, or environment. For example, the drum may include sensors 40 to measure the temperature of the clothes, the temperature of the drum material, temperature of water, speed of the drum 30, cleanliness or turbidity of water, smoke, resistivity to moisture, size or mass of a load, ozone level within water, humidity, or chemical levels in water, or any other appropriate parameters.

Figure 8:
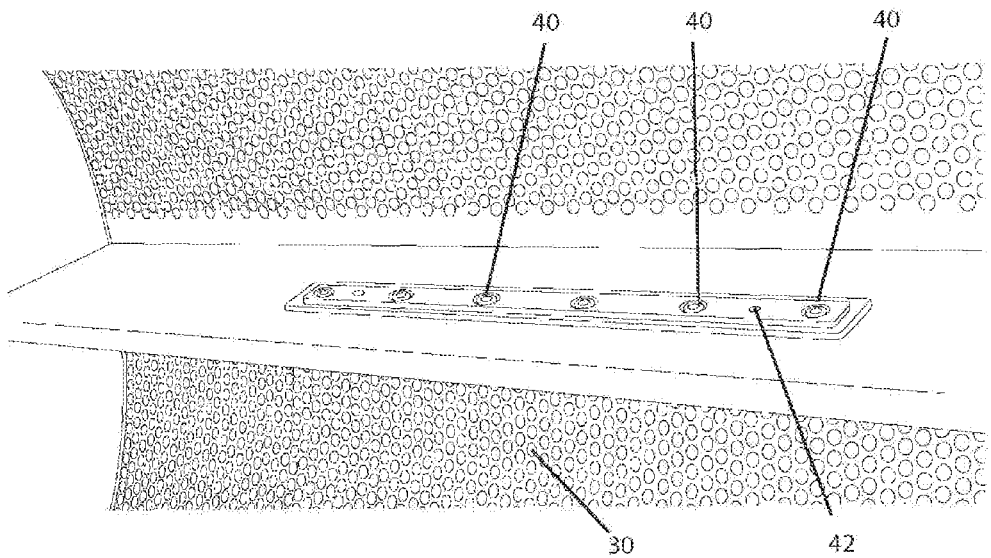
FIG. 8 illustrates a sensor strip mounted within a drum.
Figure 9:
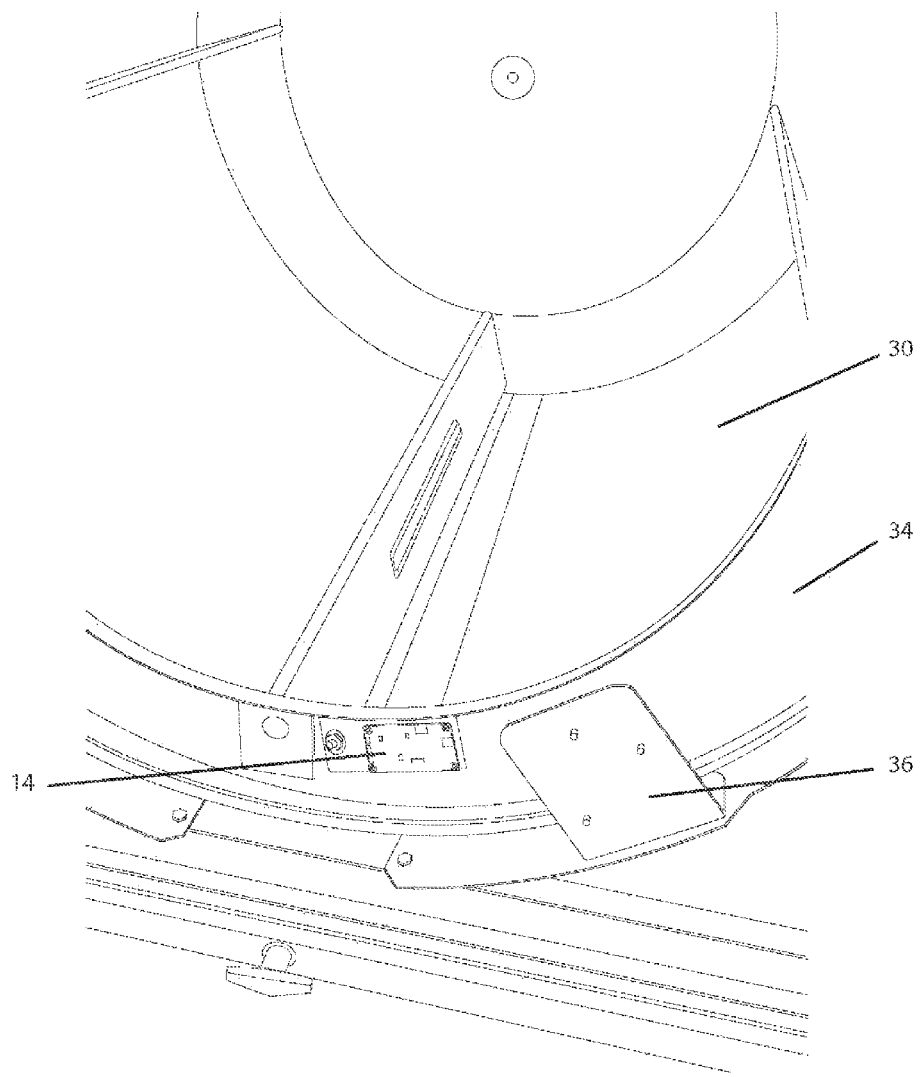
FIG. 9 illustrates a front view of a drum having a sensor strip and receiver module connected thereto.

The sensors 40 may be connected to or integrated into a strip 42, as shown in FIG. 8. The strip 42 may include one or more sensors 40, such as the sensors 40 described above. The strip 42 may be mounted to the drum 30, such as to an interior portion of the drum 30, as illustrated in FIG. 8.

The strip 42 may be connected to the receiver module 14 to receive power and to communicate sensor readings. For example, the strip 42 may be hardwired to the receiver module 14 to receive power when the secondary coil 18 is powered on. The power from the secondary coil 18 may power on the sensors 40 for long enough that they can obtain their appropriate readings. The sensor data may then be sent to the receiver module 14, by way of a hardwired connection or otherwise. The receiver module 14 may then communicate the sensor data back to the driver module 12.

In use, a driver module 12 and receiver module 14 may be provided and connected to appropriate portions of a machine, such as a laundry machine. The driver module 12 may be mounted to the base 32 and the receiver module 14 may be mounted to any moving portion of the machine, such as the rotating drum 30. The driver module 12 may receive power from a power supply 20 and generate an electromagnetic field 22 at the primary coil 16. The receiver module 14 and secondary coil 18 may be arranged to be within a desired proximity of the primary coil 16, such as less than one inch away, during at least part of the travel of the second portion of the machine. While the secondary coil 18 is within the electromagnetic field 22, it may convert electromagnetic power into electric power to power on the receiver module 14 and the sensors 40 on the sensor strip 42. The one or more sensors 40 may then obtain appropriate sensor readings and communicate the sensor data to the receiver module 12. The second wireless transceiver 26 may communicate the sensor data to the first wireless transceiver 24, and the driver module 12 may communicate the sensor data back to a machine controller 28. Once the receiver module 14 moves out of the electromagnetic field 22, the secondary coil 18 will no longer provide power to the receiver module 14 and the one or more sensors 40. The receiver module 14 and the sensors 40 will then enter a sleep mode until the secondary coil 18 is again within the electromagnetic field 22 and can provide power.

The speed of the drum 30, such as the rotational speed, may set to any appropriate speed that allows the secondary coil 18 to stay within the electromagnetic field 22 for a sufficient length of time to power the receiver module 14 and sensors 40, obtain sensor readings, and communicate the sensor data back to the first wireless transceiver 24. In testing, the drum 30 may rotate as fast as 500 revolutions per minute (RMPs). However, in normal use, the drum may have an operating speed between 40 and 60 RPMs.

While the wireless communication assembly 10 is shown and described as being used with a laundry machine, it will be appreciated that the assembly 10 as described herein may be used with any type of machine, including any machine that comprises a stationary base and a portion that moves with respect to the base. The features of the assembly 10 described herein may be used with any appropriate machine and adapted to fit the specifications of that machine.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A wireless communication assembly comprising:
 a first module connected to a first portion of a machine, the first module comprising:
  a primary coil configured to generate an electromagnetic field; and
  a first wireless transceiver;
 a second module connected to a second portion of the machine and comprising:
  a secondary coil configured to convert electromagnetic field energy into electric power; and
  a second wireless transceiver powered by the secondary coil and configured to wirelessly communicate with the first wireless communication transceiver;
 one or more sensors positioned on the second portion of the machine, the one or more sensors in communication with the second module;
 wherein the electromagnetic field includes a boundary, wherein the intensity of the electromagnetic field within the boundary is high enough to power on the one or more sensors positioned on the second portion of the machine and wherein the intensity of the electromagnetic field outside of the boundary is not high enough to power on the one or more sensors positioned on the second portion of the machine;
 wherein the second wireless transceiver is configured to wirelessly communicate data from the one or more sensors to the first wireless transceiver; and
 wherein, the second portion of the machine is configured to move rotationally with respect to the first portion of the machine; and
 wherein the secondary coil is configured to be positioned within the electromagnetic field boundary during only a portion of the rotational travel of second portion.

2. The wireless communication assembly of claim 1, wherein the second portion of the machine is a drum configured to rotate with respect to the first portion of the machine.

3. The wireless communication assembly of claim 2, wherein the drum is cylindrical.

4. The wireless communication assembly of claim 3, wherein the machine is a clothes washing machine or a clothes dryer.

5. The wireless communication assembly of claim 1, wherein the machine is a laundry machine.

6. The wireless communication assembly of claim 1, wherein the first wireless transceiver and second wireless transceiver communicate via Bluetooth communication.

7. The wireless communication assembly of claim 1, wherein the first module is in communication with a controller on the machine and configured to provide the controller with data related to the one or more sensors.

8. The wireless communication assembly of claim 1, wherein the one or more sensors are configured to measure at least one of temperature, moisture, speed, turbidity, ozone level of water, humidity, chemical level of water, or resistivity of clothes to moisture.

9. The wireless communication assembly of claim 1, wherein the primary coil and secondary coil are configured to resonate at the same frequency.

10. The wireless communication assembly of claim 1, wherein the primary coil is positioned less than one inch away from the secondary coil during at least a portion of the movement of the second portion of the machine.

11. A method of obtaining remote sensor data comprising:
providing a first module connected to a first portion of a machine, the first module comprising a primary coil and a first wireless transceiver;
providing a second module connected to a second portion of the machine, the second module comprising a secondary coil and a second wireless transceiver;
providing electric power to the primary coil to create an electromagnetic field;
rotating the second portion of the machine with respect to the first portion of the machine into a position wherein the secondary coil is within the electromagnetic field;
converting electromagnetic power at the secondary coil into electric power;
powering one or more sensors and the second wireless transceiver with the electric power;
receiving data from the one or more sensors at the second module; and
communicating data related to the one or more sensors from the second wireless transceiver to the first wireless transceiver;
wherein the electromagnetic field includes a boundary, wherein the intensity of the electromagnetic field within the boundary is high enough to power on the one or more sensors positioned on the second portion of the machine and wherein the intensity of the electromagnetic field outside of the boundary is not high enough to power on the one or more sensors positioned on the second portion of the machine; and
rotating the second portion of the machine into a rotational position wherein the secondary coil is outside of the boundary of the electromagnetic field.

12. The method of claim 11, wherein the second portion of the machine is a cylindrical drum configured to rotate with respect to the first portion of the machine.

13. The method of claim 11, wherein the machine is a laundry machine.

14. The wireless communication assembly of claim 11, wherein the machine is a clothes washing machine or a clothes dryer.

15. The method of claim 11, wherein the first wireless transceiver and second wireless transceiver communicate via Bluetooth communication.

16. The method of claim 11 further comprising the step of communicating the data related to the one or more sensors to a controller on the machine.

17. The method claim 11, wherein the one or more sensors are configured to measure at least one of temperature, moisture, speed, turbidity, ozone level of water, humidity, chemical level of water, or resistivity of clothes to moisture.

18. The method of claim 11, wherein the primary coil and secondary coil are configured to resonate at the same frequency.

19. The method of claim 11, wherein the electromagnetic field is a time-varying electromagnetic field.

20. The method of claim 11 further comprising the step of moving the second module to a position wherein the secondary coil is located less than one inch away from the primary coil.

* * * * *